March 31, 1970    R. F. WILLIAMS, JR., ET AL    3,504,075
METHOD OF MANUFACTURING HIGH-GLOSS POLYMERIC FILMS
Filed Oct. 26, 1967

ROBERT F. WILLIAMS, JR.
RICHARD H. JENKS
INVENTORS

BY

ATTORNEYS 3,504,075
Patented Mar. 31, 1970

3,504,075
METHOD OF MANUFACTURING HIGH-GLOSS POLYMERIC FILMS
Robert F. Williams, Jr., Webster, and Richard H. Jenks, Rome, N.Y., assignors to Eastman Kodak Company, Rochester, N.Y., a corporation of New Jersey
Continuation-in-part of application Ser. No. 9,567, Feb. 18, 1960. This application Oct. 26, 1967, Ser. No. 678,303
Int. Cl. B29d 7/14
U.S. Cl. 264—175   16 Claims

ABSTRACT OF THE DISCLOSURE

Increased stiffness and better clarity of polymeric films can be obtained by (cold) compression rolling relatively thick films of the polymers, provided the films are coated with enough liquid "lubricant" to form a "hydrodynamic wedge" at the juncture of the rolls with the film. Films having higher modulus and greater clarity (than could otherwise be produced) can be manufactured by this process.

---

This application is a continuation-in-part of U.S. patent application Ser. No. 565,305, filed July 14, 1966, which was a continuation-in-part of U.S. patent application Ser. No. 197,217, filed May 7, 1962, which in turn was a continuation-in-part of U.S. patent applications Ser. No. 9,567, filed Feb. 18, 1960, Ser. No. 16,208, filed Mar. 21, 1960, and Ser. No. 30,324, filed May 19, 1960, and now abandoned. Application Ser. No. 16,208 was a continuation-in-part of U.S. patent application Ser. No. 833,666, filed Aug. 10, 1959 (now abandoned) which, in turn, was a continuation-in-part of U.S. patent application Ser. No. 706,626, filed Jan. 2, 1959 (now abandoned).

This invention relates to the fabrication of strong, clear, transparent film in sheets from organic polymeric thermoplastic film.

Sheeting made from synthetic organic thermoplastic materials has found considerable utility for packaging purposes, photographic film base, and the like. However, it has been desired to have improved stiffness and clarity for many of these polymeric films. In addition, it has been desirable to incorporate into the polymeric materials one or more of a large number and types of additives such as stabilizers, antioxidants, ultraviolet absorbers, slip agents, antiblocking agents, moisture-proofing agents, and the like.

Various methods are known for improving the physical characteristics of polymeric film; for instance, the material may be extruded into a quench bath. Some films may be stretched in one or both directions and still others may be calendered using heated rolls above the softening temperature of the polymeric films. However, the clarity of some of these films has not been satisfactory for many purposes, and it has been desirable to find a method of improving the clarity. Moreover, the stretching method tends to enlarge any pin holes or voids which may be existing in the polymeric film as originally prepared. This further decreases the moisture-barrier properties of the film and decreases its usefulness for packaging purposes.

The addition of additives to polymeric materials usually occurs prior to the extrusion step or solution step if the film is to be cast. The additive is added to the polymer and incorporated throughout the resulting structure. Therefore, it is necessary to know before preparing the initial film what additive or additives are to be added to the polymeric film. This necessarily reduces the ability of the manufacturer to add additives once a film strip has been prepared, and it has been desired to find a method of adding various agents to the film depending upon its ultimate use after the film has been extruded or cast. Moreover, it has been determined that most of the additives in polymeric film exert their beneficial effect at the surface of the film. Accordingly, it is preferable to have the additive located solely at the surface of the film if this were conveniently possible, not only to increase the effectiveness of the additive but to decrease the quantity of the additive required which would not be needed in the interior of the film.

We have found a method of compression rolling polymeric film formed by either extrusion or cast-coating which improves (1) the clarity of the film, (2) the moisture-barrier properties, (3) the stiffness as measured by Young's modulus, and (4) the tensile strength as well as other mechanical properties. We have also found a method of incorporating additives in the surface during the compression-rolling operation.

One object of this invention is to provide a method for compression rolling polymeric materials at lower temperatures than used previously for obtaining the same thickness reduction. An additional object is to provide a process of compression rolling polymeric materials using lubricants. A further object of this invention is to provide a method of improving the crystalline structure or orientation of the molecules in polymeric films. Another object is to provide polymeric materials which have additives incorporated in the surface of the polymeric films. An additional object is to provide a method of incorporating various additives into the surface of the polymeric films.

The above objects are obtained by compression rolling the polymeric film under specific operating conditions. The polymeric sheeting is passed between rollers having a pressure sufficient to decrease the film to one-half to one-tenth in thickness. A lubricant is used on the polymeric film as it passes through the nip between the two rollers. This lubricant can be applied to either the polymeric sheeting directly or placed on the rollers so it is transferred to the polymer as it passes between the rollers. The temperature of the pressure rollers depends on the density and the softening temperature of the polymer. For most polymers, the temperature can be at room temperature, but it may be varied from 40–300° F. depending upon the polymer.

By a lubricant is meant a liquid or material that acts as a liquid in the area where pressure from the rolls is applied to the film. The lubricant in this case acts to form a full or partial fluid film between the roll and the polymeric film. Thus, the roll surface and polymeric film are separated by the liquid lubricant which prevents contact and increases mobility as the film enters the nip. This fluid film formation is based on the hydrodynamic theory for bearings. The theory and experimental data prove that by applying a copious supply of lubricant with the proper geometry and sufficient speed a hydrodynamic wedge or film is formed. This results in effectively reducing the nip or load area which results in higher unit stresses for a given load. Thus the effective peak pressure generated in the nip is increased by the hydrodynamic effect over that which would be expected by elastic theory.

This type of lubrication deviates from the common or conventional boundary type where a lubricant, liquid or solid, is impregnated or applied to the polymeric surface. Conventional lubrication is based on the theory of boundary lubrication which effectively reduces friction in the range of mu=.2 or .3 to mu=.1 to .15. The claimed unique method of producing a hydrodynamic film results in coefficient of friction values in the order of mu=.001. This reduction in friction has minor effect in reducing dry skidding and heat generation. The majority effect of using a hydrodynamic wedge is in its ability to effectively reduce the area under load, thus with the same total load create a much higher unit pressure. In order to produce the hydrodynamic wedge that is necessary for the successful practice of this invention, it has been found that there must be at least about 0.005 pound (and preferably at least about 0.01 pound) of liquid lubricant on the entire surface of the film as it is treated, per square foot of film surface area. Apparently, there is no critical upper limit to the amount of lubricant that can be used, since "excess" lubricant (i.e., the amount in excess of that amount needed to continually maintain the "hydrodynamic wedge") will simply drain away from the rolls. However, since very large amounts of lubricant on the films can cause some minor stability problems with respect to the maintenance of steady pressures on the rolls, it is generally preferred that at most about 0.2 pound of lubricant per square foot of film surface be utilized in the present processes. For purposes of comparison, it should be noted that the minimum amounts of lubricant required to successfully practice this invention are many times the maximum amounts tolerable in, for example, the prior art practice of using various liquid silicones as "mold release" agents. In some comparative experiments, for example, it was found that the maximum amount of a conventional liquid silicone "mold release" material was only about 0.00000003 pound per square inch of molded plastic material. The use of larger amounts of the "mold release" compound than this (about $3 \times 10^{-8}$ lb./sq. ft.) resulted in the destruction of the desired smooth surface of the molded plastic article.

In the event that water is used as a lubricant, it is desirable to add a wetting agent such as Aerosol OT which is dioctyl sodium sulfosuccinate. A sufficient amount of the lubricant is used to cover the surface of the polymer as it passes between the rolls. The application may be by spray, wick, immersion coating, etc. Methods of insuring surface coverage may be used such as air knife, bar, wick, and the like. The lubricant which may be used must be an inert material which will not adversely affect the finished product, and it should preferably wet the surface sufficiently to cover the surface at the point of pressure during the compression-rolling operation. The additives, if desired, are incorporated into the lubricant and the lubricant is chosen so that it will form a solution of the additive in our preferred embodiment, although emulsions or suspensions can be used, particularly when the additive is an inorganic solid such as silica or the like.

In the event that a particular organic chemical were to be used as an additive, it might be dissolved in a solvent such as ethyl alcohol or the like and used as a lubricant. Various solvents may be combined to form a suitable lubricating mixture which will satisfactorily dissolve the additive and incorporate it into the surface of the film.

A group of antioxidant compounds suitable for use as additives to polyolefins according to our invention include phenolic compounds. This group includes: phenol; alkylphenols, such as 2,4-dimethyl-6-tertiarybutylphenol and 2,6-ditertiarybutyl 4-methylphenol; alpha-naphthol; dihydroxyphthalenes, such as 1,5- and 1,7-dihydroxynaphthalenes and the monoalkylethers thereof; 1-hydroxy-4-alkoxy - 5,8 - dihydronaphthalene; catechol and alkyl catechols including nordihydroguiairetic acid; dihydroxybenzene, such as hydroquinone, and alkyldihydroxybenzenes and monoalkylethers thereof, such as 2-tertiarybutyl-4-methoxyphenyl; trihydroxybenzenes such as pyrolgallol and alkylpyrogallols; alkyl gallates; 2,2-dimethyl-5-hydroxy - 6 - tertiarybutylcoumaran; and 2,2-dimethyl-6-hydroxy-7-tertiarybutylcoumaran. It can be seen that the phenolic compounds may be mono or polynuclear and may contain one or more hydroxyl groups (that is to say they be mono- or polyhydric phenols) and substituted hydroxyl groups such as alkoxy substituents.

Another group of organic antioxidant compounds particularly suitable for adding in accordance with this invention comprises p-substituted anilines wherein the p-substituent is selected from the group consisting of hydroxyl, amino and alkylamino radicals, e.g., p-amino-anilines and p-hydroxyanilines. This group of compounds may be further classified as p-substituted-N-alkylanilines wherein the p-substituent is selected from the group consisting of hydroxyl, amino and alkylamino radicals such as p-amino-N-alkylanilines; p-alkylamino-N - alkylanilines; and hydroxy-N-alkylanilines. This group of compounds includes p-sec-butylamino-N-sec-butyl-aniline, p-hydroxy-N-methylaniline, p-n-butylamino-N-n-butyl - aniline, and o-methyl-p-sec-butyl-amino-N-sec-butylaniline.

The foregoing and similar organic antioxidant compounds may be used individually, and also two or more of these organic compounds may be used together.

The following may also be used: synergistic stabilizer combination comprising a 4-alkoxy-2-hydroxybenzophenone and a diester of beta, beta'-thiodipropionic acid as disclosed in U.S. Patent 2,972,597, issued Feb. 21, 1961, and U.S. Patent 2,861,053, issued Nov. 18, 1958; a synergistic stabilizer combination comprising a 4-alkoxy-2-hydroxybenzophenone and a zinc N,N-dialkyldithiocarbamate as disclosed in U.S. Patent No. 2,972,597, issued Feb. 21, 1961; a synergistic stabilizer combination comprising a 4-higher alkoxy-2-hydroxybenzophenone and an alkylene-bis-phenol of the group consisting of 2,2'-methylene-bis(4-methyl-6 - (1 - methylcyclohexyl) phenol) and 4,4-ethylenedioxybis(2-tertiarybutylphenol) as described in U.S. Patent 2,976,260 issued Mar. 21, 1961; a synergistic stabilizer combination comprising a 4-alkoxy-2-hydroxybenzophenone and N,N'-diphenyl - p - phenylenediamine as described in U.S. Patent 2,947,721 issued Aug. 2, 1960; a stabilizer combination comprising resorcinol monobenzoate and 2,2'-methylenebis(6-tertiarybutyl - p-cresol) as described in U.S. Patent 2,983,709 issued May 9, 1961; a stabilizer combination comprising a tris-(dialkylamino) phosphine oxide and a 2-hydroxy-4,4'-dialkoxy-benzophenone as described in U.S. Patent) 3,003,996 issued Oct. 10, 1961; a stabilizer combination comprising 2,2'-methylenebis(6-methylcyclohexyl - p - cresol) and a 2-hydroxy-5-alkylbenzophenone as described in U.S. Patent 3,000,856 issued Sept. 19, 1961, and a mixture of copper stearate and p-tertiarybutylphenol.

Agents which may be incorporated in the surface of polyolefin materials include those which are finely-divided solids. For instance, these may be silicas, aluminum hydroxide, talcum powder, ground glass, titanium dioxide and the like. Various concentrations may be used and the solid material may be used in the form of a dispersion. Varying degrees of fineness may be used for solid materials, but colloidal size is preferred. The incorporation of finely-divided solid material into the surface of polyolefins improves the adhesion of coatings on the polyolefin surface and also improves its ability to retain printing and the like. Other agents which may be incorporated by adding to the lubricants during compression rolling, include slip agents, such as various polymeric materials, which can be added to the lubricating agent. Typical of these are silicones having a viscosity of 1400 c.p.s. or less, aliphatic and aromatic amides, preferably of 12–25 carbon atoms, i.e., stearamide, or the like. Commercially available slip agents such as Armid-O may be used.

Antiblocking agents may also be added as well as moistureproofing agents. Typical antiblocking agents include diatomaceous earth, ethylene distearamide, and the like. Typical moistureproofing agents include microcrystalline wax and paraffin wax. In many instances, the additives which are used may accomplish more than one purpose. For instance, the use of talc as an additive may not only provide a slip agent or antiblocking agent but may also improve the surface so that it has improved the adhesive properties.

Many other additives are known in the art and these can be also incorporated into the surface of a polymeric film in a similar manner. It would not be feasible to list every known additive, but the ones shown herein are typical of those which may be added by combining with a suitable lubricant for use in compression rolling of polyolefins. In some instances, the additives may be prepared in the form of an emulsion and suitably added by using the emulsion as a lubricant.

Several additives may be used in combination depending upon the ultimate use of the polyolefin sheeting.

Polymers such as polyolefins which may be further improved in the processing characteristics by quenching the molten polymer are first heated to obtain a clear melt and then extruded through a suitable die to obtain a film of the desired thickness. The film may then be quenched by passing it into cold water or else onto a chilled cold roll so that the polymer is solidified and cooled rapidly during contact with the support to a temperature far enough below its recrystallization temperature to avoid clustering of crystals or excessive formation of spherulities. The cooling liquid could be as warm as 210° F. and could be cooled down to about −65° F. depending upon the melting point of the polymer and the size of the cooling medium.

Polyolefins may be compression rolled which are substantially crystalline selected from those polyolefins obtained by polymerizing an α-olefin having 2–10 carbon atoms or copolymers of these α-olefins.

Polyolefins which are within the scope of our invention include polyethylene and polypropylene which are substantially crystalline and also blends of polyolefins, polyolefins such as poly - 4 - methylpentene-1, poly-3-methylbutene-1, polyallomers and related homologs.

The propylene-olefin polyallomer is a normally solid, crystalline polymer prepared as by first polymerizing propylene to form a crystalline, propylene polymer and then copolymerizing said propylene polymer with another α-olefin having 2–10 carbon atoms until the resulting product has an olefin content of as much as 20% by weight.

In compression rolling polyethylene, we use a polyethylene having a density of .910 to .975 g./cc. obtained in a sheet 2–10 times the thickness which is desired in the finished sheet. The polyolefin sheeting is passed between rolls having a pressure sufficient to decrease the film ½ to ¹⁄₁₀ in thickness. The temperature of the pressure rolls depends on the density and the softening temperature of the polyolefin; for polyethylene, the temperature preferably would be in the range of 40–240° F.; for polypropylene, 40–285° F., preferably 100–270° F.

Various methods of heat treating the polymer sheeting may be used such as surface winding on a take-up roll and then heating the roll in an oven. However, temperature and time relationships can be balanced, a higher temperature relaxing the film in a shorter time. The temperature at which the film is relaxed must be approximately the creep temperature of the particular polymer and must be lower than the fatigue temperature of the polymer. By fatigue temperature, as used herein, is intended the temperature at which the tensile strength of the polymer is between 14 and 20 pounds per square inch. The creep temperature is the temperature at which the length of a test specimen is increased or decearsed 2% of its original length, when the test specimen is supporting a linear load of 10 grams per square millimeter and the temperature is being increased at the rate of 10° C. per minute.

By using a lubricant in compression rolling, we can obtain an improved modulus and transparency for a thicker film than can be obtained using the same type of polymer without a lubricant. Additional improvements obtained by using a lubricant include a clearer film than is obtained under similar conditions without using a lubricant. The pressure required is not as high to obtain the same reduction and thickness. Moreover, static charges are reduced in the rolling operation and may be completely eliminated. Film may be rolled flat for certain uses such as packaging without the need for a separate step of heat treatment. Irregularities in the film thickness or gauge are not as critical when lubricants are used as when film is rolled dry. The roll finish is not as critical for obtaining surface gloss with lubricants since scratches or imperfections will be filled or covered by the film of lubricant which covers the rolls.

The rate at which the film is rolled by the pressure roll is not critical, since satisfactory films can be produced at speeds from 2½ feet per minute upwards to about 1700 feet per minute.

Various polymeric materials may be used in our process including polyesters such as polyethylene terephthalate, polyamides (nylon), polycarbonates, chlorinated polyethers, polyacetals, cellulosics, such as cellulose acetate, cellulose propionate, cellulose butyrate and the like, halogenated polyolefins such as polytetrafluoroethylene, etc.

Lubricants that might be used would be hydrocarbons such as xylene, VMP naphtha, esters such as butyl acetate, alcohol such as butanol, ethers such as diethyl Cellsolve, alcohol-ethers such as 2-ethoxyethanol, ketones such as methylisobutyl ketone, glycols such as ethylene and diethylene glycol, water with and without a wetting agent, paraffin or paraffin emulsions, low-molecular weight polyethylene waxes and the like.

The same set of rollers can be used for compression rolling multiple strips of polyolefin sheeting for obtaining two or more compression rolled strips at the same time.

In order to compression roll multiple strips, two or more sheets of the polymer are fed into the compression rolls having a lubricant covering the surfaces of the polymeric sheeting as it contacts the rolls at the nip. When the sheets have similar chemical compositions, the lubricant must also cover the surface of the polymeric sheeting where it contacts another similar surface to avoid obtaining adhesion of the strips to each other. However, if the chemical composition of the sheets is dissimilar enough, such as polyethylene rolled with polypropylene; no lubricant is required between the dissimilar sheets.

The multiple rolling process is particularly adaptable to compression rolling lay-flat tubing. This tubing can be prepared by methods already known in the art. However, in our preferred embodiment, the polymeric tubing, such as polypropylene, is prepared by dry extruding seamless tubing into a water bath where the tubing is inflated with a liquid having a higher density than water before running the tubing through pinch rolls. The gauge of the tubing is determined by the liquid level inside the tubing, the density of the liquid, and the draw-down between the die and the pinch rolls. This process is particularly useful for polypropylene since an improved product is obtained when the lateral stretching of the polypropylene occurs at the time it is quenched. The process of compression rolling multiple strips is set forth in United States Patent No. 3,194,863 to Williams et al.

Figure 1:
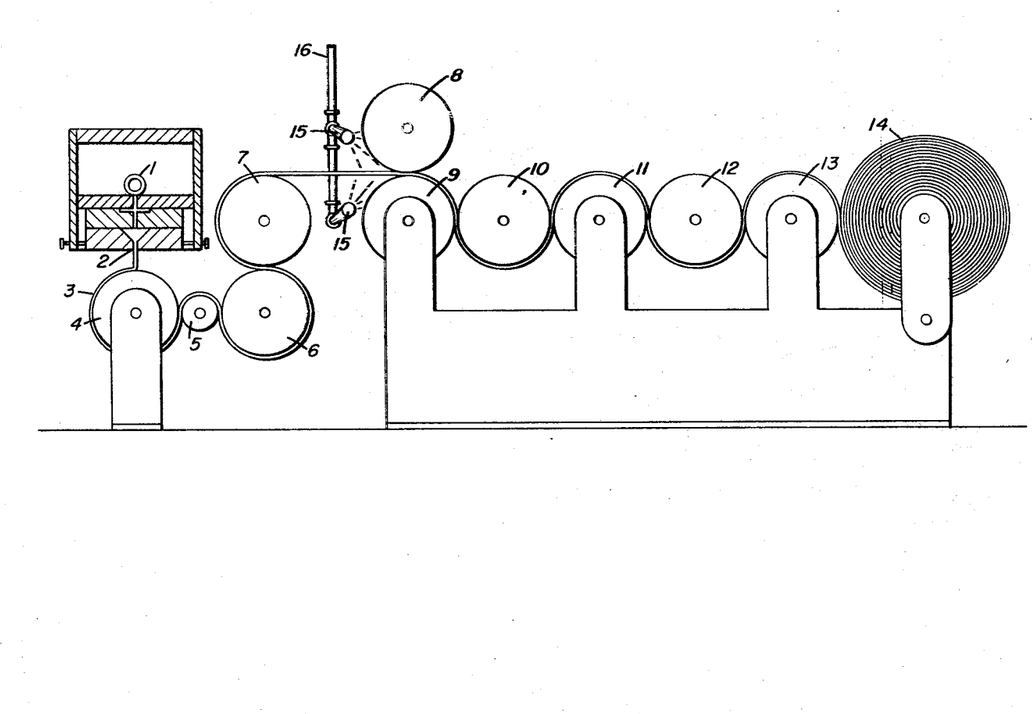
The accompanying drawing illustrates one embodiment of our invention.

The polymer 3 in this embodiment is extruded from the extruder 1 through the die lip 2, onto a chilled roll 4, around the idler roller 5, through the tension rollers 6 and 7, and between the pressure rollers 8 and 9, at which point the polymer is reduced in thickness to nineteen-twentieths to one-tenth of the thickness as extruded. Next the polymer passes around the idler roller 10 to relaxing roller 11 which is heated to about 200° F., past the idler roller 12 and around the chilled roller 13 to take-up 14. All the rollers are similarly supported except for the pressure roller which requires a heavy support. Lubricants are applied through nozzles 15 associated with the plate 16 connected to the lubricant. After the film has passed through the nip of the pressure rolls, it is usually desirable to keep the film against the surface of a roll until the film is wound. This technique helps to prevent distortion of the film by unbalanced pressures which may occur if the film is run unsupported.

With certain of the polymeric materials the polymer may be reduced to clear melt by feeding pellets of the polymer between two heated rollers until the polymer reaches a molten state and then passing it through a series of rollers in a similar manner as described above. With others such as the cellulose esters, polycarbonates, etc., films may be prepared by casting a dope on a polished surface.

It will be apparent to one skilled in the art that the position of the rollers may be changed from horizontal to vertical and they may be arranged in various positions relative to each other, such as in the S or Z position. The idler rollers are used to facilitate transfer of the polymeric sheeting without large heat transfers from the rollers which are maintained at certain temperatures. However, these could be dispensed within the interest of conserving space as long as the polymeric film is supported at all times.

The following examples are intended to illustrate our invention but not to limit it in any way:

EXAMPLE 1

The following table shows examples of polymeric materials which have been compression rolled according to our invention.

| Sample | Lubricant | Roll Temp., °F. | Percent Extension | Modulus, $10^5$ p.s.i. Length | Modulus, $10^5$ p.s.i. Width | MIT Folds Length | MIT Folds Width | Elmendorf Tear, g. Length | Elmendorf Tear, g. Width |
|---|---|---|---|---|---|---|---|---|---|
| Polyester | Diethylene glycol | 200 | 194 | 6.4 | 2.0 | 2,000+ | 2,000+ | 848 | 192 |
| Cellulose triacetate | Aerosol OT solution | 150 | 6 | 5.7 | 5.7 | 46 | 50 | 48 | 48 |
| Do | Paraffin emulsion* | 150 | 23 | 6.5 | 5.5 | 37 | 58 | 25 | 23 |
| Do | Xylene | 220 | 12 | 5.6 | 5.4 | 21 | 43 | 45 | 48 |
| Do | Check—not calendered | | | 4.7 | 5.8 | 39 | 51 | 64 | 63 |

*Paraffin emulsion—4 g. paraffin, 4 g. Aerosol OT, 500 ml. water, 200 ml. isopropanol.

EXAMPLE 2

A sheet of high density polyethylene having a density of .962 g./cc. was prepared as described in Example 8 having 60 mils thickness and also drawn perpendicular to the direction of extrusion at 100° F. to a thickness of 25 mils (140% extension). It was then pressure rolled parallel to the direction of extrusion at 240° F. to a thickness of 5 mils (400% extension). The film was wound to prevent any elastic recovery in either direction and heated for 30 minutes at 240° F. The modulus of the finished film was 4.0 to $4.5 \times 10^5$ pounds per square inch. The percent scattered light was less than 3% and the creep temperature was above 240° F.

EXAMPLE 3

In the following table, results are shown for the percent extension obtained with polyolefins when rolled with a lubricant and without a lubricant. Methanol was used as the lubricant for polyethylene; ethylene glycol was used for polypropylene.

The minimum percent extension using lubricant was determined which was required to eliminate the visual haze in the original films. This was at 80° F. for polyethylene and 200° F. for polypropylene. Each sample was extruded from a clear melt. One and three were extruded onto a chilled roll. Two and four were extruded into a quench bath.

| Polyolefin | Roll Temp., °F. | Percent Extension With Lubricant | Percent Extension Without Lubricant |
|---|---|---|---|
| 1. Medium Density Polyethylene (density 0.93) | 80 | 304 | 83 |
| 2. Hi-Density Polyethylene Phillips Type (density 0.96) | 80 | 403 | 213 |
| 3. Hi-Density Polyethylene Ziegler Type (density 0.955) | 80 | 376 | 184 |
| 4. Polypropylene | 200 | 376 | 196 |
| 5. Low Density (density 0.920) | 80 | 355 | 104 |

Various additives which are soluble in methanol and ethylene glycol are added to the lubricant prior to the compression rolling. The amount of additive varies depending upon the viscosity of the lubricant but sufficient additive should be placed in the lubricant so that .01–1% of the additive based on the weight of the polyolefin is incorporated on the surface. Tests of the polyolefins which are stabilized or which are inhibited by the addition of the stabilizer-inhibitor on the surface in the amount of .01–1% are found to have satisfactory stabilization as compared with those in which the inhibitor or stabilizer is incorporated throughout the polyolefin itself.

EXAMPLE 4

The following table gives a comparison of properties of polyolefin films obtained by pressure rolling using lubricants and without lubricants. The minimum roll temperatures for obtaining the required extension with dry rolling and with lubricants was determined to eliminate the visual haze in the original films. The samples were extruded as in Example 13.

COMPARISON OF PROPERTIES OF POLYOLEFIN FILMS BY LUBRICATING AND DRY ROLLING

| Roll Procedure | Roll Temp., °F. | Percent Extension | Film Thickness (mils) | Percent Total Scattered Light | Elmendorf Tear (grams) | Modulus ($10^5$ p.s.i.) | Temp., °F., 2% distortion under 50 p.s.i. load (Relaxed Film) | Relaxed ½ hour under sufficient tension to prevent shrinkage, °F. | MVTR,* grams per 100 in.$^2$ per 24 hrs. |
|---|---|---|---|---|---|---|---|---|---|
| 1. Medium Density Polyethylene: | | | | | | | | | |
| Lubricated (MeOH) | 80 | 304 | 1.2 | 1.11 | 448 | 1.4 | 194 | 220 | 0.11 |
| Dry | 120 | 304 | 1.2 | 3.17 | 176 | 0.8 | 192 | 220 | |
| 2. Phillips Process Hi-Density Polyethylene: | | | | | | | | | |
| Lubricated (H$_2$O/Aerosol OT) | 80 | 403 | 2.2 | 2.48 | 32 | 2.5 | 237 | 239 | 0.11 |
| Dry | 150 | 392 | 2.2 | 3.07 | 48 | 2.2 | 232 | 239 | 0.11 |
| 3. Ziegler Process Hi-Density Polyethylene: | | | | | | | | | |
| Lubricated (H$_2$O/Aerosol OT) | 80 | 376 | 2.2 | 2.56 | 16 | 2.2 | 217 | 239 | 0.10 |
| Dry | 160 | 376 | 2.2 | 3.27 | 16 | 2.2 | 223 | 239 | 0.13 |
| 4. Polypropylene: | | | | | | | | | |
| Lubricated (ethylene glycol) | 200 | 376 | 2.3 | 1.84 | 16 | 2.9 | 266 | 284 | 0.25 |
| Dry | 240 | 377 | 2.2 | 3.49 | 16 | 3.4 | 246 | 284 | 0.24 |

*MVTR represents Moisture Vapor Transmission Rate.

NOTE.—All physical properties in the above table were determined on films in the direction parallel to that of extension by rolling, except for scattered light and MVTR.

EXAMPLE 5

Haze and extension determinations as follows were made on medium density polyethylene (0.93 g./cc.). Films were pressure rolled at a roll temperature 80° F. using film extruded from a clear melt onto a chilled roll.

| Lubricant | Thickness Original | Mils After Rolling | Percent Extension | Total Scattered Light |
|---|---|---|---|---|
| Butyl Acetate | 4.5-5.0 | 1.0-1.5 | 280 | 1.57 |
| Hexane | 4.5-5.0 | 1.5 | 217 | 3.20 |
| Xylene | 4.5-5.0 | 1.5 | 217 | 3.44 |
| Butyl Alcohol | 4.5-5.0 | 1.5 | 217 | 1.95 |
| Water | 4.5-5.0 | 1.5 | 217 | 4.69 |
| Methyl Alcohol | 4.5-5.0 | 1.5 | 217 | 1.60 |

EXAMPLE 6

Maximum extension values were determined as follows for medium density polyethylene (0.93 g./cc.) extruded as in Example 5.

| Lubricant | Roll Temperature | Thickness Original, Mils | Percent Extension |
|---|---|---|---|
| Isopropyl Alcohol | 80 | 30 | 322 |
| Petroleum Oil | 80 | 30 | 335 |
| Methyl Ethyl Ketone | 80 | 30 | 310 |
| Cyclohexane | 80 | 30 | 376 |
| Tetralin | 80 | 30 | 388 |
| Methyl Alcohol | 80 | 30 | 350 |

EXAMPLE 7

The following determinations show the relationship between polyethylene samples of varying densities of samples pressure rolled using methyl alcohol as a lubricant. The polyethylene was extruded as in Example 5 with no appreciable drawdown and the samples were not heat treated.

| Density | Haze, percent | Thickness | Modulus Above | MVTR, g./100 in.²/24 hrs. |
|---|---|---|---|---|
| .91-.929 | <3 | 2.5 | $1.0 \times 10^5$ | .20 |
| .93-.945 | <3 | 2.5 | $2.0 \times 10^5$ | .15 |
| .946-.97 | <3 | 2.5 | $2.5 \times 10^5$ | .10 |

EXAMPLE 7a

Polypropylene was prepared by melting to form a clear melt and extruded to form polypropylene film 38 mils in thickness. This film was quenched on a chill roll having a temperature of about 70° F. The film was then tentered at 270° F. to a thickness of 6.3 mils. It was then compression rolled in the direction of extrusion at 240° F. to a thickness of 1.6 mils employing a lubricant of 10% ethylene glycol in water, the lubricant covering the film at the point of pressure.

The following results were obtained:

| | Length | Width |
|---|---|---|
| Tensile strength at break, lbs./sq. in | 13,700 | 15,200 |
| Elongation at break, percent | 20.2 | 24.3 |
| Modulus, lbs./sq. in | $3.5 \times 10^5$ | $3.5 \times 10^5$ |
| Elmendorf Tear, grams | 23 | 26 |
| Haze | 2.0 | 2.0 |

EXAMPLE 8

A propylene polyallomer containing ethylene and having a density of 0.906 g./cc. and a flow rate of 1.38 at 230° C. using a 2160 g. load was extruded from a 1½" Modern Plastics extruder as five mil strip. The melt temperature of the polyalomer entering the die of the extruder was 225°. The lips of the extruder die were set 20 mils apart and the strip was drawn down to 5.6 mil before being quenched in a 24° water bath located four inches from the extruder die lips. The extruded and quenched strip was compression rolled using a 10% ethylene glycol/90% water lubricant between polished steel rolls heated to 127° C. The thickness of the strip after one pass between the rolls was 1.2 mil. Physical properties determined on the film after compression rolling were:

| | |
|---|---|
| Moisture vapor transmission (grams/100 sq. in./24 hr.) | 0.53 |
| Lemon oil permeability (grams/100 sq. in./24 hr.) | 2.5 |
| MIT folds: | |
|   Length | 500+ |
|   Width | 500+ |
| Percent haze | 2.7 |
| Tensile at yield, $10^3$ p.s.i.: | |
|   Length | 33.6 |
|   Width | 3.8 |
| Elongation at yield percent: | |
|   Length | 30.7 |
|   Width | 5.8 |
| Modulus, $10^5$ p.s.i.: | |
|   Length | 3.3 |
|   Width | 1.7 |

EXAMPLE 9

A propylene polyalomer containing butene-1 having a density of 0.913 g./cc. and a flow rate of 2.0 at 230° using a 2160 g. load was extruded as strip. This polyallomer was extruded at a melt temperature of 223 C. into a 24 C. water bath as strip 5.9 mil thick. The strip was compression rolled between polished steel rolls heated to 127° C. using a 10% ethylene glycol/90% water lubricant to 1.3 mil film.

Physical properties determined on the compression rolled film were:

| | |
|---|---|
| Moisture vapor transmission (grams/100 sq. in./24 hr.) | 0.40 |
| Lemon oil permeability (grams/100 sq. in./24 hr.) | 1.44 |
| Percent haze | 2.32 |
|   Length | 500+ |
|   Width | 5.3 |
| Elongation at yield percent: | |
|   Length | 38 |
|   Width | 4.8 |
| Modulus, $10^5$ p.s.i.: | |
|   Length | 4.8 |
|   Width | 2.4 |

EXAMPLE 10

Blends were prepared of a high density polyethylene resin having a density of 0.96 g./cc. and a low density polyethylene resin having a density of 0.925 g./cc. by mechanically mixing the pellets of the compositions prior to extruding. These blends were extruded as strip onto a chill roll, then compression rolled in a two-roll Fenn Mill using a .03% Aerosol OT/water solution as the lubricant. Conditions for rolling and physical properties determined on the compression rolled films were:

| Composition, Percent | | Roll Temp., °C. | Percent Roll Down | Percent Haze | Modulus, $10^5$ p.s.i. | | Moisture Vapor Transmission, g./100 in./24 hr. |
|---|---|---|---|---|---|---|---|
| High Density Polyethylene | Low Density Polyethylene | | | | Length | Width | |
| 10 | 90 | 63 | 500 | 2.1 | 1.3 | 1.25 | 0.15 |
| 25 | 75 | 63 | 520 | 1.6 | 2.3 | 1.6 | 0.11 |
| 50 | 50 | 63 | 573 | 2.0 | 3.1 | 2.0 | 0.17 |

EXAMPLE 11

A strip of polyethylene terephthalate was extruded and quenched to produce an amorphous structure. The amorphous strip was tentered to 3 times its original width then compression rolled to 3.5 times its original length. The tentered strip was compression rolled at 127° C. using a 20% ethylene glycol/80% water lubricant. Modulus values determined in three directions were:

| Direction of sample: | Modulus, $10^5$ p.s.i. |
|---|---|
| Length (compression rolling direction) | 6.6 |
| Width (tentering direction) | 6.1 |
| Diagonal (45° to length and width) | 6.2 |

This balance in modulus between the length, width and diagonal is a significant improvement over the balance found in films of this composition oriented by conventional tente ring and drafting procedures. Attempts to compression roll this film without a lubricant but at the same roll temperature and pressure resulted in less than 30% extension in the length of the strip.

EXAMPLE 12

A polycarbonate resin having an intrinsic viscosity of 1.12 in methylene chloride at 25° C. was plate coated as a film from a 1,1,2-trichloroethane dope of the resin. X-ray diffraction patterns of the cured film indicated the structure was crystalline. Percent haze of the film as cured was 27.3. This film was compression rolled from a thickness of 4 mils to 2 mils between rolls heated to 104° C. using a 0.03% Aerosol OT/water lubricant. Percent haze of the compression rolled film was 6.0.

EXAMPLE 13

A polycarbonate resin (intrinsic viscosity in methylene chloride of 1.45) plasticized with 10 parts triphenyl-phosphate was coated on a coating wheel from a methylene chloride dope. The coated and cured film was 5.4 mils thick and the percent haze was 21.4. This film was compression rolled to a thickness of 3.45 mils between rolls heated to 110° C. using ethylene glycol as a lubricant. Percent haze of the compression rolled film was 5.5.

EXAMPLE 14

A melt of polyhexamethylene adipamide was extruded from a 1½ inch Modern Plastic extruder as five mil film. The take-off equipment for removing the film as it was extruded was a water tank and a Fenn Mill compression roll assembly. The tank was filled with a water quenching bath. Thus, the extruded five mil film of polyhexamethylene adipamide entered the water bath where it was quenched and then was fed directly from the bath into the nip between the two 10½ inch diameter polished steel rolls of the Fenn Mill and reduced in thickness to 1.6–2.0 mils. The percent haze determined on the film after compression rolling was in excess of 12.

It is believed that the poor haze factor possessed by the compression rolled polyhexamethylene adipamide film is directly attributed in large measure to the fact that the film was not evenly covered by the water carried thereon. A visual inspection of the polyhexamethylene adipamide film leaving the water bath and entering the compression roll assembly revealed that the water tended to "puddle" or otherwise run off the film prior to its reaching the roller nip.

EXAMPLE 15

A melt of polyhexamethylene adipamide was extruded from a 1½ inch Modern Plastic extruder as five mil film. The take-off equipment for removing the film as it was extruded was a roll take-up assembly. Thus, the extruded five mil film of polyhexamethylene adipamide was solidified while being conveyed through room temperature air and was then wound. The wound polyhexamethylene adipamide was then compression rolled between the two 10½ inch diameter polished steel rolls of a Fenn Mill to a thickness of 1.5–1.6 mils. A standard Stoddard solvent was placed on both surfaces of the five mil film just prior to its entering the nip of the rolls. Since the Stoddard solvent is not absorbed by the polyhexamethylene adipamide film but rather spreads evenly over the surface of the film, it acts as a "lubricant" within the meaning of the term as used in this invention. The percent haze of the film that had been compression rolled with Stoddard solvent as a lubricant was 0.9–1.0.

Thus, by comparing the results of this example with that obtained under the conditions set out in Example 14, it can be seen that acceptable results can be obtained only when the film is evenly covered with a lubricant.

EXAMPLE 16

A section of the roll of five mil polyhexamethylene adipamide film that had been extruded into air and wound in the manner set forth in Example 15 was compression rolled in the Fenn Mill, and reduced in thickness to 1.6–1.7 mils using Aerosol OT/water lubricant applied to both sides of the film. The percent haze determined on the dry film compression rolled with the Aerosol OT/water surface lubricant was 2.6.

EXAMPLE 17

A hygroscopic polymer in the form of nylon was soaked in water for 24 hours at 75° F. After being removed from the water bath, the surface of the sheet was wiped free of surface water and weighed. The gain in weight determined was 7.47%. A similar sheet of polyethylene was also soaked in water for the same period of time under the same conditions. The gain in weight was 0.03%.

Separate sheets of both nylon and high-density polyethylene were compression rolled using water as a lubricant. The polymeric sheets had not been soaked in water and the lubricant was applied to the surface of the sheets at the point of pressure between the compression rolls.

The following table shows the comparison between the compression-rolling operation using a lubricant and compression rolling the films directly after soaking in water for 24 hours:

| Sheet | Roll Temp., °F. | Thickness, mils Before Rolling | Thickness, mils After Rolling | Percent Haze |
|---|---|---|---|---|
| Nylon: | | | | |
| As received | 100 | 1.8 | 1.7 | 7.51 |
| Soaked in H₂O 24 hr | 100 | 1.8 | 1.6 | 9.33 |
| Soaked in H₂O 15 hr | 200 | 1.8 | 1.5 | 15.4 |
| Lubricated with .03% Aerosol OT/H₂O lubricant while being compression rolled | 200 | 1.8 | 0.6 | 2.59 |
| High Density polyethylene: | | | | |
| As received | 100 | 2.3 | 1.9 | 55.6 |
| Soaked in H₂O 24 hr | 100 | 2.3 | 2.1 | 35.9 |
| Lubricated with .03% Aerosol OT/H₂O | 100 | 2.3 | 1.1 | 10.9 |
| Lubricated with .03% Aerosol OT/H₂O while being compression rolled | 200 | 2.3 | 0.5 | 2.5 |

The roll pressure used with all the samples was the maximum that could be obtained on a No. 102 Fenn Mill equipped with rolls 10 inch in diameter. These results illustrate the difference in the effect of internal plasticization and surface lubrication on compression rolling of nylon and high-density polyethylene.

EXAMPLE 18

Spencer type 401 Nylon was extruded from a 1½ inch Modern Plastic extruder as five mil film. The take-off equipment for removing the film as it was extruded was a tank and roll assembly. The tank was filled with 60° F. water until it was within six inches of the extruder die lips. A roll of film was then extruded and left submerged in the tank filled with water for twenty-four hours. After the film was soaked for twenty-four hours, it was removed from the tank taking all possible precautions to prevent removing any water that adhered to the surface of the film. This soaked film was compression rolled immediately after removal from the tank between two 10½ inch diameter polished steel rolls in a Fenn Mill and reduced in thickness to 1.5–1.6 mils. The percent haze determined on the film after compression rolling was 8.7–11.1.

Thus it is readily seen that the same haze factor is produced in a nylon film whether its surface has all the water thereon that it will carry, as is the case in this Example, or is wiped dry as was done in Example 17. Therefore, it is apparent that the polyamide is plasticized by saturating it with water and that the water cannot function as a lubricant during compression rolling.

EXAMPLE 19

A commercially-obtained sheet of polystyrene having an average thickness of 5.0 mils was compression rolled satisfactorily using a lubricant. The following data were obtained:

| Polymer | Lubricant | Roll Temp., °F. | Pressure, lbs. | Percent Extension |
|---|---|---|---|---|
| Polystyrene | None | 200 | 50,000 | 0 |
| Do | H₂O | 200 | 50,000 | 8 |
| Do | .03% Aerosol/H₂O | 200 | 50,000 | 14 |
| Do | 10% Glycol/90% H₂O | 200 | 50,000 | 16 |

EXAMPLE 20

A commercially-obtained sheet of polytetrafluoroethylene having an average thickness of 5.0 mils was compression rolled satisfactorily using a lubricant. The following data were obtained:

| Polymer | Lubricant | Roll Temp., °F. | Pressure, lbs. | Percent Extension |
|---|---|---|---|---|
| Polytetrafluoroethylene | None | 170 | 2,000 | 95 |
| Do | .03% Aerosol/H₂O | 170 | 2,000 | 113 |
| Do | 10% Glycol/90% H₂O | 170 | 2,000 | 127 |
| Do | Toluene | 170 | 2,000 | 125 |
| Do | Silicone | 170 | 2,000 | 120 |

EXAMPLE 21

A sheet of cellulose acetate butyrate was prepared by extruding the cellulose acetate butyrate from a clear melt to form a sheet having an average thickness of 4.6 mils. The sheet was satisfactorily compression rolled using a lubricant with the results disclosed in the following table:

| Polymer | Lubricant | Roll Temp., °F. | Pressure, lbs. | Percent Extension |
|---|---|---|---|---|
| Cellulose acetate butyrate | None | 190 | 27,000 | 32 |
| | | | 35,000 | 37 |
| | | | 47,000 | 31 |
| | | | 50,000 | 38 |
| | .03% Aerosol/H₂O | 190 | 20,000 | 75 |
| | | | 25,000 | 90 |
| | | | 35,000 | 95 |
| | | | 48,000 | 120 |
| | H₂O | 190 | 15,000 | 67 |
| | | | 20,000 | 91 |
| | | | 50,000 | 107 |
| | Solvent naphtha | 190 | 40,000 | 78 |

EXAMPLE 22

A polyacetal obtained commercially under the name Delrin was extruded to form a sheet having an average thickness of 38 mils. This material was satisfactorily compression rolled as shown in the following table:

| Polymer | Lubricant | Roll Temp., °F. | Pressure, lbs. | Percent Extension |
|---|---|---|---|---|
| Polyacetal | None | 200 | 18,000 | 182 |
| | .03% Aerosol/H₂O | 200 | 15,000 | 469 |
| | do | 200 | 9,000 | 264 |
| | H₂O | 200 | 5,000 | 249 |
| | H₂O | 200 | 4,000 | 159 |

EXAMPLE 23

A commercially-obtained sheet of polyvinyl chloride having an average thickness of 10.1 mils was compression rolled satisfactorily using a lubricant. The following data were obtained:

| Polymer | Lubricant | Roll Temp., °F. | Pressure, lbs. | Percent Extension |
|---|---|---|---|---|
| Polyvinyl chloride | None | 200 | 5,000 | 83 |
| | H₂O | 155 | 6,000 | 116 |
| | .03% Aerosol/H₂O | 175 | ¹9,000 | 116 |
| | do | 165 | ¹9,000 | 102 |
| | do | 155 | 6,000 | 124 |
| | | 125 | 5,000 | 102 |
| | 10% Octyl/Phthalate/90% Isopropanol | 200 | 5,000 | 88 |
| | do | 155 | 6,000 | 93 |
| | do | 155 | 9,000 | 126 |

¹ Maximum.

EXAMPLE 24

Antioxidants

Strips of unstabilized polypropylene were compression rolled from 24 mils to 8 mils thickness at a roll temperature of 200° F. After 42 hours under an ultraviolet lamp, a dry rolled strip had an inherent viscosity in tetralin of 0.50. A strip rolled with an isopropanol lubricant containing 8% 4,4' thiobis(6-tertiary butyl 3-methyl phenol) had an inherent viscosity of 1.31 after the same exposure.

EXAMPLE 25

Antiblocking agents

An extruded polypropylene strip was dry rolled from 20 mils to 5.5 mils at a roll temperature of 200° F.; a strip of the same thickness was rolled to 5.0 mils using an isopropanol lubricant containing 24% Armid O (oleamide). A block test similar to ASTM 884–48, in which the samples were heated 16 hours at 81° C. under a 5 p.s.i. load, rated the dry rolled sample as blocking badly and the lubricated sample with Armid O (oleamide) as no block.

EXAMPLE 26

Antiblocking agents

An extruded polypropylene strip was dry rolled from 20 mils to 5.5 mils at a roll temperature of 200° F.; a strip of the same thickness was rolled to 5.0 mils using an isopropanol lubricant containing diatomaceous earth in dispersion. A block test in which the samples were placed under a 1.0 p.s.i. load for 380 hours at room temperature rated the dry rolled sample as blocking and the lubricated sample with diatomaceous earth as no block.

EXAMPLE 27

Slip agents

The rolled strips of Example 21 were subjected to a slip test that measured the force in grams necessary to slide the sample across itself. A slip test result of 15 was obtained on the dry rolled sample and 7 on the sample rolled with Armid O (oleamide) in isopropanol.

EXAMPLE 28

Various additives including stabilizers, inhibitors, slip agents, antiblocking agents, surface modifiers, moisture proofing agents and the like are incorporated in the lubricants and the polyolefins shown in the above examples compression rolled and stress set to obtain transparent polymeric films. The haze measurements as expressed in percent total scattered light are in no way decreased significantly due to the presence of the incorporated additives, nor are the other characteristics such as the percent extension, tear strength, modulus or moisture vapor transmission affected adversely by the incorporation of the additives in the lubricant.

EXAMPLE 29

Haze and extension determinations as follows were made on medium density polyethylene (0.93 gram per cc.). Films were compression rolled at a roll temperature of 80° F. using film extruded from a clear melt onto a chilled roll.

| Lubricant | Original Thickness, Mils | Thickness After Rolling, Mils | Percent Extension | Percent Scattered Light |
|---|---|---|---|---|
| Butyl Acetate | 4.5–5.0 | 1.0–1.5 | 280 | 1.57 |
| Hexane | 4.5–5.0 | 1.5 | 217 | 3.20 |
| Xylene | 4.5–5.0 | 1.5 | 217 | 3.44 |
| Butyl alcohol | 4.5–5.0 | 1.5 | 217 | 1.95 |
| Water with wetting agent | 4.5–5.0 | 1.5 | 217 | 2.13 |
| Methyl alcohol | 4.5–5.0 | 1.5 | 217 | 1.60 |

When additives are incorporated in a lubricant sufficiently to improve the surface, to stabilize and to inhibit the polyolefin, the percent scattered light is found to remain substantially the same.

EXAMPLE 30

Maximum extension values were determined as follows from medium density polyethylene (0.93 gram per cc.) extruded as in Example 29.

| Lubricant | Roll Temp. | Original Thickness, Mils | Percent Extension |
|---|---|---|---|
| Isopropyl alcohol | 80 | 30 | 322 |
| Petroleum Oil | 80 | 30 | 325 |
| Methyl ethyl ketone | 80 | 30 | 310 |
| Cyclohexane | 80 | 30 | 376 |
| Tetralin | 80 | 30 | 388 |

Whenever additives such as stabilizers and inhibitors are incorporated in the lubricants sufficient to incorporate about 0.1–1.0% by weight of the additive, the physical properties of the polyolefin are the same as when the samples are compression rolled using the lubricants without having the incorporated additives.

The crystalline structure of the film may be determined by X-ray diffraction patterns as is well known in the art. In the event that stretching is desirable, the polymeric film may be stretched in a direction laterally perpendicular to the direction in which the compression rolling takes place. The stretching step may be carried out using customary tentering equipment or it may be obtained by extruding plastic tubing which is extended laterally by causing the tubing to be filled with a fluid such as air, water or the like. In one embodiment of our invention, the polymer is extruded as a tubing into a water bath and stretched by having a liquid contained inside the tubing, which is preferably of greater density than the water.

A roll stack may be used which would eliminate the extruder where pellets are used which are converted into film by masticating rolls, then rolled down and relaxed on successive rolls in the stacks.

The pressure rolls have a pressure of at least 100 pounds per linear inch depending upon the polymer measured along the line where the sheeting passes between the two rolls. In other words, if 6-inch long rolls were used, the pressure exerted by the rolls, if the pressure were 300 pounds per linear inch, would be 1,800 pounds total pressure exerted by the rolls. In the event that the polymeric film is an amorphous polyester, it may be stretched in one direction at temperatures of 70–105° C. and then rolled in a direction substantially at right angles to the direction of stretch in a rolling mill at temperatures of 50–80° C. using a lubricant. The film may then be heat-set at a temperature of 150–250° C. while shrinkage of the film in any direction is prevented by maintaining the film under tension in the two directions.

Instead of a step requiring stretching in one direction, the polymeric film may be rolled in two directions by passing the film through the pressure rollers in a direction substantially diagonally so that the pressure rolling can be obtained in directions substantially perpendicular to each other. For small sections, however, the film may be rolled in one direction and then a section removed for rolling in a transverse direction.

A satisfactory method for measuring the second-order transition temperature is dependent upon the change in the specific heat of the polymer at that temperature. If a polymer is heated at a constant rate beginning at a temperature below its second-order transition temperature, the temperature will increase at a constant rate until the transition temperature is reached, at which point a break in the curve will occur. The determinations are made by placing the insoluble polymer with either normal-heptane or toluene at a temperature around −60° C. in a calorimeter. A constant rate of heating is obtained using an electrical heated connected to a voltage source which may be varied at will. The powdered polymer is kept suspended by an electric stirrer turning at constant speed. Temperature is measured by means of a copper-constantan thermocouple with an ice water reference point. After the calorimeter has reached equilibrium, the current is turned on so that the temperature will rise about 1° C. per minute. The zero time reading is selected at least 20° C. below transition temperature. Thereafter, the lapse time is read off a stop watch to the nearest 1/100 of a minute for every degree centigrade rise. After going 10–20° C. higher than the inflection point, as noted by the data, the information is plotted on the graph.

The polyethylene or similar polymer may be used direct from the polymerization autoclave in the melt form to make sheeting and then compression rolled.

Cellulose esters and other highly crystalline polymers do not require a high percentage extension. Possibly 5% extension would be sufficient to provide orientation.

This procedure could be modified to extrude the film directly into the nip of the pressure rolls and quench the film with the lubricant at the instant the sheet contacts the rolls at the nip. This variation would be most effective for fabricating films of polymers which cannot be quenched to amorphous structures by practical procedures. The melts of such polymers are essentially amorphous but recrystallize readily when cooled and frequently become translucent or opaque over a narrow temperature range, which will be referred to as the frost-line. A sheet of such polymers could be extruded as a clear melt directly into the nip of the pressure rolls which would be flooded with lubricant maintained at the frost-line temperature. Orientation and crystallization would occur simultaneously in this process which is the preferred sequence for most polymers. This would also make possible the fabrication of thin gauge films without draw-down or extension by drafting.

From the foregoing it is apparent that the use of a lubricant film on a polyethylene sheet as it is begin rolled results in the sheet undergoing a substantially larger percent extension than can be produced if the sheet is rolled without a lubricant. It is also of major importance that the use of such a lubricant permits an extremely thin finished sheet to be produced in one pass through the rolls with substantially less roll pressure than was heretofore thought possible. However, perhaps the most surprising and important feature of this invention is the optical clarity of the finished film. Thus, this invention which teaches how a limp and cloudy polyolefin sheet material can be transformed in one pass through a low pressure compression roll into a thin, crisp, ultra-clear sheeting through the use of a lubricant on both sides of the sheet represents a substantial step forward in the polyolefin sheeting field.

The invention has been described in detail with particular reference to preferred embodiments thereof, but it will be understood that variations and modifications can be effected within the spirit and scope of the invention as described hereinabove and as defined in the appended claims.

We claim:

1. A process for preparing a film of a polymeric material selected from the group consisting of polyolefins obtained by polymerizing α-olefins containing 2 to 10 carbon atoms, polyesters polyamides, polycarbonates, chlorinated polyethers, polyacetals, halogenated polyolefins and organic acid esters of cellulose, which process comprises (1) forming said polymeric material into a sheet, and
(2) passing the formed sheet, in a single pass, between rollers under sufficient pressure, and with the aid of an inert lubricant covering substantially all of both surfaces of the sheet at the point of pressure, to reduce its thickness to $19/20$ to $1/10$ of its original thickness thereby improving the clarity, moisture-barrier properties, tensile strength and stiffness of the film; the amount of said inert lubricant being at least about 0.005 pound per square foot of the surfaces of said formed sheet and sufficient to form and maintain a continuous hydrodynamic (full fluid film) wedge of said inert lubricant at the nips between said rollers and said sheet; and said inert lubricant being liquid at said point of pressure.

2. The process of claim 1 wherein said polymeric material is polyethylene terephthalate.

3. The process of claim 1 wherein the polymeric material is polyetetrafluoroethylene.

4. The process of claim 1 wherein said polymeric material is polypropylene.

5. The process of claim 1 wherein the lubricant has incorporated therein an additive for the polymeric material selected from the group consisting of antioxidants, stabilizers, finely divided solid materials, inhibitors, slip agents, antiblocking agents, moisture proofing agents, and mixtures thereof.

6. The process of claim 1 wherein the rollers are heated to a temperature between about 40° F. and 300° F.

7. The process of claim 6 wherein the inert lubricant consists essentially of water.

8. The process of claim 6 wherein the inert lubricant consists essentially of water and a wetting agent.

9. The process of claim 8 wherein said wetting agent is dioctyl sodium sulfosuccinate.

10. The process of claim 1 wherein the formed sheet is reduced in thickness to $1/2$ to $1/10$ that of its original thickness.

11. The process of claim 1, wherein the polymeric material is polyethylene having a density of 0.910 to 0.975 g./cc.

12. The process of claim 1 wherein the polymeric material is a mixture of high density and low density polyethylene.

13. A process for preparing a polyethylene film which comprises passing, in a single pass, a sheet prepared from polyethylene and having a density of from about .910 to .975 gram per cubic centimeter between rollers under sufficient pressure, and with the aid of an inert lubricant covering substantially all of the surfaces of the sheet at the point of pressure, to reduce its thickness of $19/20$ to $1/10$ that of its original thickness thereby improving the clarity, moisture-barrier properties, and stiffness of the film; the amount of said inert lubricant being at least about 0.01 pound per square foot of the surfaces of said formed sheet; said inert lubricant being a liquid at said point of pressure and consisting essentially of a material selected from the group consisting of hydrocarbons, esters, alcohols, ethers, alcohol-ethers, ketones, glycols, water and waxes.

14. A process for preparing a polyethylene film according to claim 13 wherein the inert lubricant consists essentially of water.

15. A process for preparing a polyethylene film according to claim 13 wherein the inert lubricant consists essentially of water and a wetting agent.

16. A process for preparing a polyethylene film according to claim 13 wherein the inert lubricant consists essentially of water and dioctyl sodium sulfosuccinate.

References Cited

UNITED STATES PATENTS

| | | |
|---|---|---|
| 2,076,793 | 4/1937 | Salender. |
| 2,219,700 | 10/1940 | Perrin. |
| 2,235,516 | 3/1941 | Cornwell. |
| 2,244,208 | 6/1941 | Miles ___________ 264—175 X |
| 2,395,396 | 2/1946 | Conaway. |
| 2,642,625 | 6/1953 | Peck __________ __264—288 X |
| 2,952,878 | 9/1960 | Swerlick et al. |
| 2,979,774 | 4/1961 | Rusignolo ________ 264—288 X |
| 3,194,863 | 7/1965 | Williams et al. _______ 264—88 |
| 3,264,136 | 8/1966 | Hedge _____________ 117—7 X |
| 2,324,397 | 7/1943 | Hall _______________ 264—180 |
| 2,820,252 | 1/1958 | Koch. |

FOREIGN PATENTS

| | | |
|---|---|---|
| 550,534 | 1/1943 | Great Britain. |
| 609,797 | 10/1948 | Great Britain. |
| 773,718 | 5/1957 | Great Britain. |

JULIUS FROME, Primary Examiner

J. H. WOO, Assistant Examiner

U.S. Cl. X.R.

264—130, 210, 288

PO-1050
(5/69)

UNITED STATES PATENT OFFICE
CERTIFICATE OF CORRECTION

Patent No. 3,504,075              Dated March 31, 1970

Inventor(s) Richard H. Jenks and Robert F. Williams, Jr.

It is certified that error appears in the above-identified patent and that said Letters Patent are hereby corrected as shown below:

In the Specification

In line 36, column 1, delete "Jan. 2, 1959" and substitute therefor ---Jan. 2, 1958---.

In column 3, line 1 delete "majority" and substitute therefor---major---.

In column 3, line 62 delete "dihydroxyphthalenes" and substitute therefor ---dihydroxynaphthalenes---.

In column 4, line 30 delete "4,4 -ethylenedioxybis-(2-tertiarybutylphenol)" and substitute therefor ---4,4'-ethylenedioxybis(2-tertiarybutylphenol)---.

In column 6, line 23 delete "Cellsolve" and substitute therefor ---Cellosolve---.

In column 9, line 75 delete "225°." and substitute therefor ---225°C.---.

In column 10, line 2, delete "224°" and substitute therefor ---24°C---.

In column 10, line 30 delete "230°" and substitute therefor ---230°C.---

UNITED STATES PATENT OFFICE
CERTIFICATE OF CORRECTION

PAGE - 2

Patent No. 3,504,075                     Dated  March 31, 1970

Inventor(s)   Richard H. Jenks and Robert F. Williams, Jr.

It is certified that error appears in the above-identified patent and that said Letters Patent are hereby corrected as shown below:

<u>In the Specification Con't.</u>

In column 10, line 33, delete "24 C." and substitute therefor ---24°C.---.

In column 10, between lines 44 and 45 insert ---MIT Folds:---.

In column 10, between lines 46 and 47 insert the following data ---Tensile at Yield,$10^3$p.s.i.,length     35.0
                                                                                          width      5.3---

In column 16, line 11 delete "heated" and substitute therefor ---heater---.

In column 16, line 49 delete "begin" and substitute therefor ---being---.

<u>In the Claims</u>

In column 17, line 21 delete "polyetetrafluoroethylene" and substitute therefor--- polytetrafluoroethylene----.

SIGNED AND
SEALED

SEP 29 1970

(SEAL)
Attest:

Edward M. Fletcher, Jr.
Attesting Officer

WILLIAM E. SCHUYLER, JR.
Commissioner of Patents